(12) United States Patent
Hoppe et al.

(10) Patent No.: US 7,638,916 B2
(45) Date of Patent: Dec. 29, 2009

(54) SECONDARY PART OF AN ELECTRICAL MACHINE

(75) Inventors: Thomas Hoppe, Altdorf (DE); Zeljko Jajtic, München (DE); Gerhard Matscheko, Stamberg (DE); Christian Volmert, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/689,154

(22) Filed: Mar. 21, 2007

(65) Prior Publication Data

US 2007/0236090 A1 Oct. 11, 2007

Related U.S. Application Data

(63) Continuation of application No. PCT/DE2005/001663, filed on Sep. 21, 2005.

(30) Foreign Application Priority Data

Sep. 22, 2004 (DE) .................. 10 2004 045 992

(51) Int. Cl.
*H02K 41/00* (2006.01)
*H02K 17/00* (2006.01)
(52) U.S. Cl. .......... 310/166; 310/168; 310/12; 310/215; 310/216; 310/218
(58) Field of Classification Search ........... 310/12, 310/44, 166, 168
See application file for complete search history.

(56) References Cited

U.S. PATENT DOCUMENTS

| 3,265,911 A * | 8/1966 | Madsen ................ 310/12 |
| 3,829,746 A | 8/1974 | Van et al. |
| 3,884,154 A * | 5/1975 | Marten ................ 104/286 |
| 4,137,884 A * | 2/1979 | Odazima et al. ........ 123/149 D |
| 4,546,282 A | 10/1985 | Hartwig |
| 4,707,630 A * | 11/1987 | Tomite et al. .......... 310/154.12 |
| 4,758,758 A * | 7/1988 | Laing ................ 310/261 |
| 4,769,624 A * | 9/1988 | Merritt et al. ........... 335/302 |
| 4,864,169 A * | 9/1989 | Rioux et al. ........... 310/12 |
| 5,105,114 A * | 4/1992 | Sickle et al. .......... 310/154.13 |
| 5,127,337 A * | 7/1992 | Beattie et al. ............ 104/294 |

(Continued)

FOREIGN PATENT DOCUMENTS

DE 3343046 A1 * 9/1984

(Continued)

OTHER PUBLICATIONS

Iwabuchi N et al: "A Novel High-Torque Reluctance Motor With Rare-Earth Magnet" IEEE Transactions on Industry Applications, IEEE Service Center. Piscataway, NJ, US, vol. 30, No. 3, May 1, 1994, pp. 609-613, XP000459019, ISSN: 0093-9994, p. 1.

*Primary Examiner*—Quyen Leung
*Assistant Examiner*—Alex W Mok
(74) *Attorney, Agent, or Firm*—Henry M. Feiereisen; Ursula B. Day

(57) ABSTRACT

A secondary part of an electric machine has a toothed profile, with at least one tooth being unlaminated. The at least one tooth is made of at least two materials, wherein the at least one tooth forms a cavity which is filled with an iron-containing material representing one of the two materials.

16 Claims, 3 Drawing Sheets

U.S. PATENT DOCUMENTS

| | | | |
|---|---|---|---|
| 5,281,881 A * | 1/1994 | Gentry et al. | 310/154.13 |
| 5,353,491 A * | 10/1994 | Gentry et al. | 29/596 |
| 5,744,887 A * | 4/1998 | Itoh | 310/156.28 |
| 6,034,450 A * | 3/2000 | Kojima et al. | 310/49 R |
| 6,342,108 B1 | 1/2002 | Lashmore et al. | |
| 6,376,957 B1 * | 4/2002 | Haydock et al. | 310/155 |
| 2002/0105237 A1 * | 8/2002 | Itoh et al. | 310/12 |
| 2003/0122440 A1 | 7/2003 | Horst | |
| 2003/0141769 A1 * | 7/2003 | Kubo | 310/12 |
| 2003/0227221 A1 * | 12/2003 | Yamamoto et al. | 310/12 |
| 2004/0239208 A1 * | 12/2004 | Ren et al. | 310/261 |

FOREIGN PATENT DOCUMENTS

| | | |
|---|---|---|
| DE | 101 26 730 A | 1/2003 |
| EP | 0 093 817 B | 11/1963 |
| EP | 532371 A2 * | 3/1993 |
| JP | 55147969 A * | 11/1980 |

\* cited by examiner

SECONDARY PART OF AN ELECTRICAL MACHINE

CROSS-REFERENCES TO RELATED APPLICATIONS

This application is a continuation of prior filed copending PCT International application no. PCT/DE2005/001663, filed Sep. 21, 2005, which designated the United States and has been published but not in English as International Publication No. WO 2006/032255 and on which priority is claimed under 35 U.S.C. §120, and which claims the priority of German Patent Application, Serial No. 10 2004 045 992.4, filed Sep. 22, 2004, pursuant to 35 U.S.C. 119(a)-(d), the contents of which are incorporated herein by reference in its entirety as if fully set forth herein.

BACKGROUND OF THE INVENTION

The present invention relates to a secondary part of an electrical machine, and to an electrical machine.

Nothing in the following discussion of the state of the art is to be construed as an admission of prior art.

An electrical machine has typically a primary part and a secondary part. The primary part has electrical windings. The electrical machine is, for example, a synchronous machine, an asynchronous machine, a stepping motor or the like. The electrical machine may, for example, be both a linear motor and a motor or generator by means of which a rotary movement can be carried out.

It would be desirable and advantageous to provide an improved secondary part which obviates prior art shortcomings and which is simple in structure.

A simple design of a secondary part is desirable in particular for a linear motor, since, for example, linear motors may have secondary parts whose size in a movement direction may exceed the size of the primary part in the movement direction by several times.

SUMMARY OF THE INVENTION

A secondary part according to the invention of an electrical machine has a toothed profile. The toothed profile is produced from a cross section of the secondary part, with the toothed profile being formed by teeth. In the case of an electrical machine which is ready to operate and has a primary part in addition to the secondary part, the teeth face the primary part. The teeth mean that there are at least two different distances between the primary part and the secondary part. The secondary part is designed in such a manner that it is unlaminated. The secondary part therefore has no laminates arranged in rows adjacent to one another, in particular in the sense of a laminated core, with lamination such as this, by means of which a laminated core is formed, being used in particular to reduce eddy currents. Laminated cores are also used in particular for primary parts. With regard to the toothed profile, it should be noted that this is formed by teeth which have a longitudinal extent approximately at right angles to a movement direction of the electrical machine. The movement direction may in this case be of a linear or else a rotary nature. A tooth is in consequence a type of bolt. A cross section through a plurality of bolts approximately at right angles to their longitudinal extent describes the toothed profile.

The toothed profile can be formed in such a manner that it has different profile shapes, that is to say geometries. Examples of geometries are a rectangular shape, a triangular shape, a sinusoidal shape, etc.

The production of a laminated secondary part is complex. The lamination in this case relates in particular to layers of laminates whose boundary surfaces which rest on one another lie at right angles to a plane which can be formed by an air gap in the electrical machine, with this being a characteristic feature of a known laminated core. The use of a design of the secondary part which is free of a layered structure such as this, as is produced in the case of a laminated core, considerably simplifies the production and the construction of the secondary part, since no joining is involved. This also simplifies the options for means for mounting of the secondary part, for example, on a machine bed.

Laminated secondary parts have low eddy-current losses. The eddy-current losses occur in particular at high frequencies. The frequencies in this case relate to a fundamental frequency of an alternating current with which the primary part of the electrical machine is or can be fed.

By way of example, an electrical machine is designed in such a manner that it has a primary part and a secondary part, with the primary part being designed in such a manner that it has two means for production of a magnetic field. The secondary part can be designed without any means for production of a magnetic field. The primary part thus has a first means for production of a magnetic field and a further means for production of a magnetic field, in which case an AC voltage or an alternating current can be applied to the first means for production of a magnetic field. By way of example, the first means for production of a magnetic field which is a first magnetic field is a winding. The further means for production of a magnetic field which is an excitation field is a means which can be used to produce a further, that is to say at least one second, magnetic field. The field excitation which produces the further magnetic field is advantageously unchanged, that is to say constant, during operation. A further means such as this for production of the further magnetic field is, for example, a permanent magnet or a winding, to which a current, which in particular is constant, is or can be applied. The further means for production of a further magnetic field advantageously has a multiplicity of further means for production of magnetic alternating-pole field excitation. The first means for production of a first magnetic field is, for example, a coil winding, with the first magnetic field, which emerges from the coil and/or enters it being passed to further means (that is to say second, third, etc.) in order to produce further magnetic fields, in such a manner that at least two further means for production of further magnetic fields are located in the field area of the first magnetic field, thus resulting in interaction between the two magnetic fields. The further means for production of further magnetic fields advantageously have a multiplicity of magnetization directions, in each case in opposite directions to one another, thus resulting in an arrangement with alternating-pole magnetization.

The electrical machine which has a primary part and a secondary part, with the primary part having a first means for production of a first magnetic field and the secondary part having a means for guidance of the magnetic field, is thus designed in such a manner that the primary part has at least two further means for production of at least two further magnetic fields, with the first means for production of the first magnetic field being arranged with respect to the further means for production of the further magnetic fields in such a manner as to allow superimposition of the first magnetic field and the further magnetic fields.

A design of the electrical machine such as this has the advantage that the secondary part of the electrical machine can be designed in such a manner that it has no active means for production of a magnetic field. However, at least the secondary part can be designed in such a manner that, in some areas which are provided for the formation of an electromagnetic force, it has no magnetically active means. The secondary part of an electrical machine such as this advantageously has only one means for guidance of magnetic fields, and can therefore be manufactured easily and at low cost. By way of example, the secondary part is laminated in order to avoid eddy currents, with an embodiment such as this being expensive and complex. Soft-iron parts can advantageously be used for the structural design of the primary part and secondary part. Lamination of these parts reduces eddy currents.

In one advantageous embodiment, the soft-iron parts of the secondary part are solid, and/or are in the form of so-called iron powder-pressed parts.

In one advantageous refinement of the secondary part according to the invention, this has a tooth mount with the teeth being integral with the tooth mount. The integral configuration of the toothed secondary part dispenses with lamination. Lamination is particularly necessary for fundamental frequencies of the electrical alternating current in the primary part of more than 25 Hz, since the eddy-current losses increase as the frequency rises, and the resultant motor power decreases. The unlaminated secondary part is in consequence advantageously used for electrical machines which are predominantly operated at an alternating-current frequency of less than 25 Hz. A further field of use for the unlaminated secondary part is in electrical machines in which the decrease in the motor power with increasing frequencies and/or with increasing motor speed is permissible in terms of the drive requirement—specification.

Secondary parts for electrical machines for operating states with a predominant fundamental frequency of the electrical alternating current of more than 25 Hz are advantageously laminated, or have measures to suppress eddy currents.

In a further refinement of the secondary part, this has a tooth mount, with at least one tooth being connected to the tooth mount by a connection means. In this case, by way of example, the tooth mount is a mounting plate on which teeth are fitted. Since the teeth have a longitudinal extent transversely with respect to the movement direction of the electrical machine, they can also be referred to as a type of bolt. The mounting plate itself is used, for example, for fitting the secondary part in or to a machine. Examples of machines such as these are machine tools, production machines or else automatic handling machines. The mounting plate is, in particular, mounted on a machine bed. The initial fitting of the teeth on a separate mounting plate simplifies installation in the machine. In a further refinement of the tooth mount, this is a part of the machine in which, in particular, the electrical machine is installed in the form of a linear motor. By way of example, it is also possible to use the machine bed of a machine as a tooth mount. A multiplicity of connection types can be used as connection means for the fitting of the tooth to the tooth mount, for example: a screw connection, a riveted joint, a welded joint, a press connection, an interlocking connection, etc.

By way of example, the teeth of a secondary part can be produced from a single material, in which case the single material may also be an alloy or some other material mixture. Depending on the method of production and the design of the secondary part, the material of the teeth may differ from the material of the tooth mount, or may be identical to it. Various features of ways to produce the secondary part are listed in the following text:

- the secondary part is milled from a metal plate;
- the secondary part is produced by means of a gray-casting process; in this case, that side of the gray casting which faces the primary part of the electrical machine is advantageously subjected to subsequent machining (for example, milling, grinding, . . . ) and contributes to the formation of the air gap;
- the secondary part has metal bars which are welded and/or riveted and/or screwed to a metal plate which acts as a tooth mount;
- the secondary part has a metal sheet which has a toothed profile; the toothed profile can be stamped into a metal sheet, for example by means of a stamping process, in particular with the metal sheet being planar before the stamping process.

If, in a secondary part, the teeth are also formed, in particular, in a direction transversely with respect to the movement direction of the electrical machine, by means of a laminate, with the laminate having a toothed profile, then the secondary part may be formed either from one material or else from a combination of materials. Stamping of a toothed profile into a metal sheet (laminate) is one example of a particularly simple way to manufacture a secondary part such as this. The stamping process results in slots which, for example, can be filled with a soft-magnetic material or else with an iron-plastic mixture. A mixture such as this can also be used as a filling material for tubes. A tube which is used as a tooth has, in particular, a rectangular cross section. By way of example, in the case of a slot, filling of the slot or of the tube not only makes it more robust, but also in particular leads to a reduction in the magnetic losses. In the case of a mixture of a plastic and a metal, the magnetically permeable metal particles are separated by the plastic, so that, if the magnetic permeability is high, eddy currents can also be avoided, or at least reduced. In the case of a filled slot, as in the case of a filled tube as well, teeth on the secondary part have at least two materials. The filling of the teeth has irons in order to guide the magnetic flux, with a cavity at least being reduced in size, or else being entirely filled, by the filling.

If the stamped laminate or the tube is composed of iron, it itself carries a portion of the magnetic flux. If this is a thin-walled laminate, its wall thickness may not be sufficient to carry all of the magnetic flux, since the thin laminate becomes magnetically saturated, and this can have a negative effect on the motor power. In a situation such as this, it is also advantageous to use a soft-magnetic filling, that is to say one containing iron, for flux guidance. In a further refinement, the magnetic function of the stamped laminate can be dispensed with entirely. The stamped laminate, or the wall of the tube, is then used only as a dimensionally stable packaging material and/or as a fitting or attachment aid for the magnetically relevant filling material for magnetic flux guidance. The dimensionally stable packaging material and/or the fitting or attachment aid which, for example, is manufactured from plastic, is then also used, for example, as a means for absorption of magnetic drive and attraction forces on the linear motor, which act on the tooth structure of the secondary part.

In a further refinement, after the process of manufacturing the secondary part, the filling is itself mechanically solid and robust, so that the dimensionally stable packaging material is now used only as a "template" for the filling during the manufacturing of the secondary part. The template is removed once the filling has cured. This has the advantage that the air gap in the electrical machine can be kept small. By way of example, the filing is composed of a ferrite material, which cures on the basis of a sintering process.

In a further refinement, the metal sheet is not only stamped but is also punched. By way of example, holes for attachment of the secondary part by means of screws or rivets can be produced by means of the punching process.

If a laminate is used to form the secondary part, then it is either possible to place a plurality of laminates one on top of the other for this purpose, or just one laminate is used. In the case of a plurality of laminates, the boundary surfaces between the laminates are located in the region of the air gap of the electrical machine, parallel to the plane formed by the air gap.

In order to reduce the eddy-current losses in a secondary part, it can also be designed as follows. On the one hand, it is advantageous to use at least sintered teeth. In addition, the tooth mount can also be sintered, in which case the teeth and the tooth mount can also be formed integrally. Sintered teeth and the sintered tooth mount can be produced, for example, by means of a powder pressing process. Eddy-current losses can be reduced by the use of sintering.

A reduction in the eddy-current losses such as this can also on the other hand be achieved by a die-casting or injection-molding process. The teeth, the tooth mount and/or the secondary part can be produced as die-cast or injection-molded parts in a die-casting or injection-molding machine. A plastic enriched with metal parts is used as the material for the die-cast or injection-molded part. Die-cast or injection-molded parts can be produced easily and at low cost. An integral tooth and tooth mount configuration can also be produced easily. A die-cast or injection-molded part which can be used as an insert part for attachment of the secondary part to the machine bed can also be sprayed with the aid of the die-casting or injection-molding process.

In a further embodiment, a secondary part according to the invention as already described above can also be designed in such a way that the tooth is formed from at least two materials. This design can be used, for example, in such a way that one tooth has a tube. By way of example, this tube has a rectangular cross section, so that it can easily be fitted on a flat surface which is formed by a tooth mount. The tube may be manufactured from stainless steel or else from aluminum, with the wall thickness of the tube preferably being thin. In order to restrict the magnetic losses, the tube may be filled with a material which carries a magnetic flux. By way of example, an iron-plastic mixture may be used for the filling material. This has the advantage that eddy-current losses are reduced despite the lack of a laminated core. By way of example, the tube is connected to the tooth mount by means of a welded joint.

In a further refinement of the secondary part, it has teeth which form a type of groove. One example of a groove is a tube with a rectangular cross section in which one side is missing, so that the tube becomes a groove. The groove can be used as a tooth, with the groove being filled, like the tube, with a filling material, and the open side of the groove, for example, being adjacent to the tooth mount. The open side can also point towards the primary part, in which case the open side then faces away from the tooth mount.

Both the tube and the groove are examples of a secondary part in which a tooth forms a cavity, with the cavity being filled with a material which has a metal, in particular iron.

In addition to the secondary part of an electrical machine, the invention also relates to the electrical machine itself. According to the invention, an electrical machine which has a primary part and a secondary part, with the secondary part having a toothed profile, can be designed in such a manner that one or more teeth are unlaminated. The lamination in this case relates in particular to lamination in which the laminates are in a row adjacent to one another, in such a manner that this row is at least approximately at right angles to an air gap in the electrical machine. An electrical machine such as this advantageously uses a secondary part as has been described in the above description, and as is shown by way of example below in the Figures.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
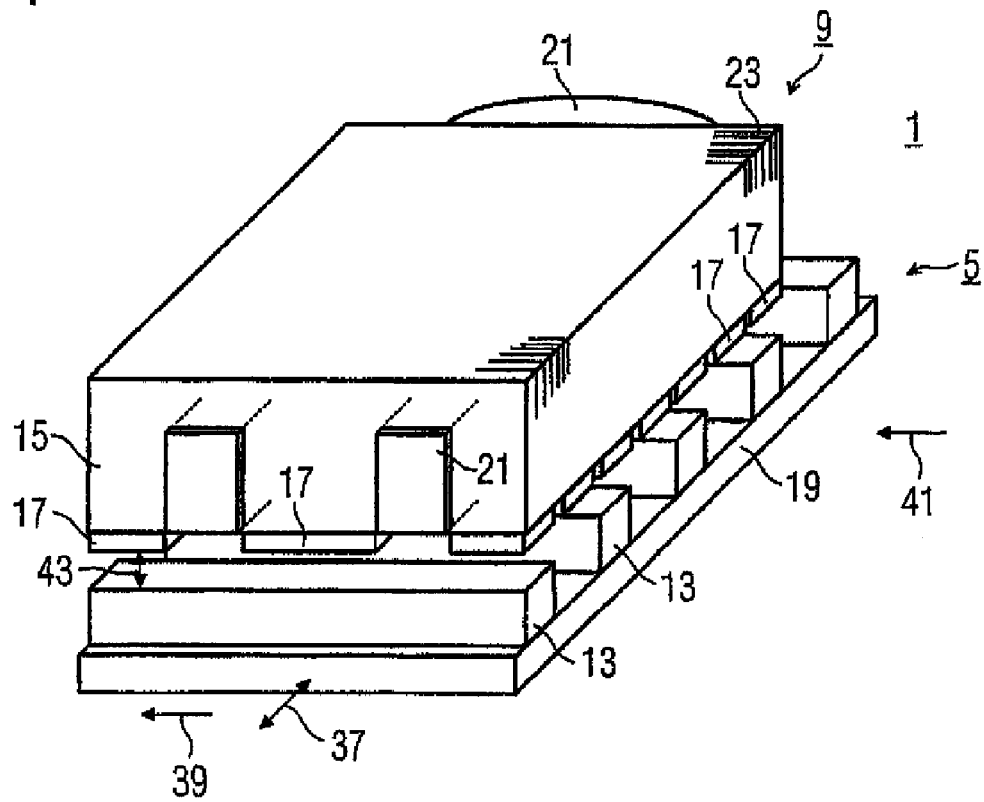
FIG. 1 shows a basic illustration of a linear motor having permanent magnets on a primary part.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned and have different inventive entities. Both applications are unique. Accordingly, reference is hereby made to commonly assigned copending U.S. patent application, entitled "Electric Machine", based on international application no. PCT/EP2005/054630. This commonly assigned copending U.S. patent application discloses an electrical machine whose secondary part has no active means for production of a magnetic field. Active means such as these are, for example, permanent magnets or also windings through which an electrical current can be passed. In the case of a permanent-magnet synchronous linear motor with a secondary part without any permanent magnets, for example, the primary part has windings through which a current can be passed and has permanent magnets, with the secondary part having a tooth structure composed of a material which contains iron, with the teeth on the secondary part pointing towards the primary part. This application discloses a passive secondary part, which is laminated. The use of a secondary part which is laminated is complex, and is time-consuming to produce.

Turning now to the drawing, and in particular to FIG. 1, there is shown an electrical machine 1 in the form of a linear motor. The electrical machine 1 has a primary part 9 and a secondary part 5. The primary part 9 has a winding 21, permanent magnets 17 and a laminated core 23. The possible movement direction of the primary part 9 is indicated by means of a double-headed arrow 37, which runs in a longitudinal direction of the electrical machine. The perspective of a side view is indicated by means of an arrow 41 with FIGS. 2 to 8 being used to illustrate a cross section through the secondary part in this side view. The laminated primary part 9 has permanent magnets 17 on the side which faces the secondary part 5. The permanent magnets 17 are fitted to the primary part 9 in such a manner that their magnetization alternates. The permanent magnets thus produce a magnetic flux whose direction alternates transversely with respect to an air gap 43. The air gap between the primary part 9 and the secondary part 5 forms an air-gap plane, with the secondary part 5 having teeth 13, and with the teeth 13 on the secondary part being adjacent to this air gap 43. The movement of the electrical machine 1, which in the present case is a linear machine, takes place in the longitudinal direction 37. In this case, it is possible either for the primary part 9 to be stationary and for the secondary part 5 to move, or for the secondary part 5 to be stationary and for the primary part 9 to move over the secondary part 5. The winding 21 is a first means for production of a first magnetic field, and the permanent magnets 17 are further means for production of further magnetic fields.

The movement direction which is supported by the electrical machine may be of a linear or else of a rotary nature. The illustrations in FIGS. 1 to 8 relate to linear movement directions in the longitudinal direction 37. The illustration in FIG. 9 shows a detail of a cross section of a rotating electrical machine 3. This electrical machine 3 has a primary part 11 and a secondary part 7. The two parts have a circular cross section. The primary part 11, like the primary part of a linear motor, has windings 21, winding teeth 15 and permanent magnets 17. Arrows 35 indicate the alternating magnetization direction of the permanent magnets 17. The secondary pad 7 has teeth 13, with the teeth 13 being separated from the primary part 11 by the air gap 43. By way of example, the secondary part 7 in FIG. 9 is integral. The teeth 13 have a longitudinal alignment, which is not illustrated, along a rotation axis 49, so that the teeth 13 form a type of bolt. A cross section through plurality of bolts approximately at right angles to their longitudinal extent, describes the toothed profile.

The secondary part 5 has a tooth mount 19, on which teeth 13 are arranged. The tooth-like configuration can clearly be seen in the side view 41. The side view 41 is shown transversely with respect to a possible movement direction 37 of the electrical machine 1, with this representing a longitudinal direction of the electrical machine. The teeth 13 also have a longitudinal direction, but this corresponds to the longitudinal direction of the teeth in the transverse direction 39 with respect to the electrical machine 1. The teeth 13 on the secondary part 5 are fixed on a tooth mount 19. The teeth 13, which can also be referred to as bolts, are, for example, adhesively bonded, soldered or welded to the mount 19, or are connected to one another in conjunction with attachment facilities. Since the negative eddy-current effects are not very pronounced, particularly when the alternating current fundamental frequencies which flow through the windings of the primary part are low, the lamination can be dispensed with and, for example, a low-cost solid part can be used as a tooth. Low fundamental frequencies are in a range below 25 Hz.

Figure 2:
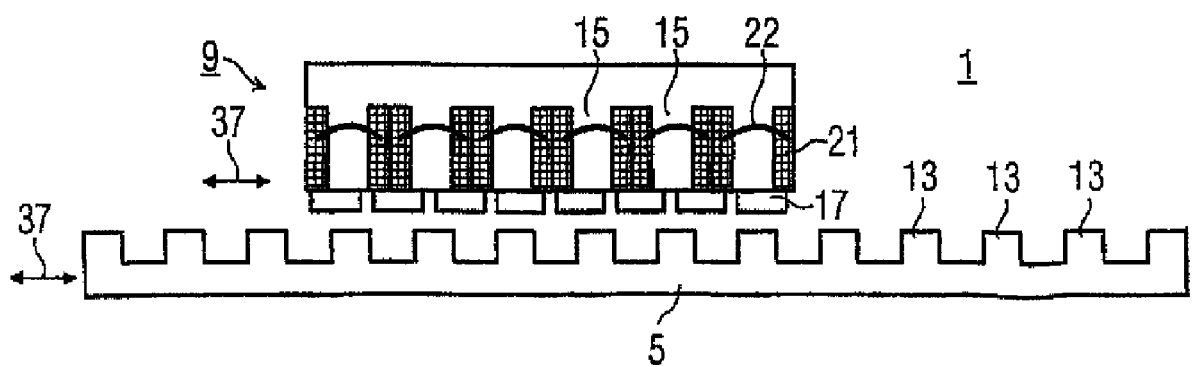
FIG. 2 shows a cross-sectional view through a linear motor.

The illustration in FIG. 2 shows, schematically, the cross section through a linear motor, with the cross-sectional plane running parallel to or along a movement direction 37 of the linear motor. The secondary part 5 is integral and has teeth 13. In addition to permanent magnets 17, the primary part 9 also has windings 21. The windings surround winding teeth 15 of the primary part 9. End windings 22 of the windings are illustrated symbolically by curved lines.

Figure 3:
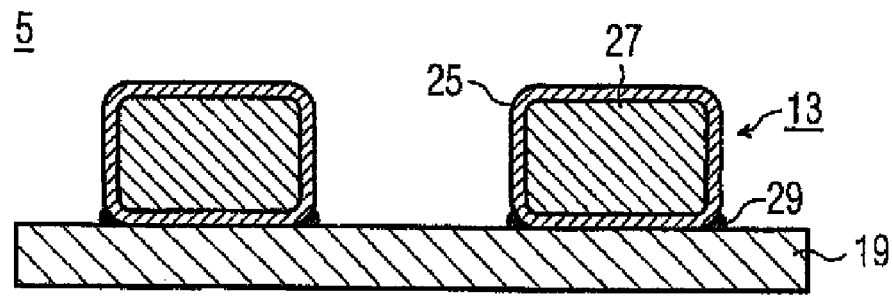
FIG. 3 shows a first cross section through a secondary part of a linear motor.

The illustration in FIG. 3 shows a further example of one possible configuration of a secondary part 5. The secondary part shown in FIG. 3 has a tooth mount 19 to which teeth 13 are welded. The teeth 13 have a four-sided tube 25. This tube 25 is filled with a filling material 27. By way of example, the filling material 27 is an iron-plastic mixture. The tube 25 which, for example, is composed of iron or aluminum, is firmly connected to the tooth mount 19 by weld beads 29.

Figure 4:
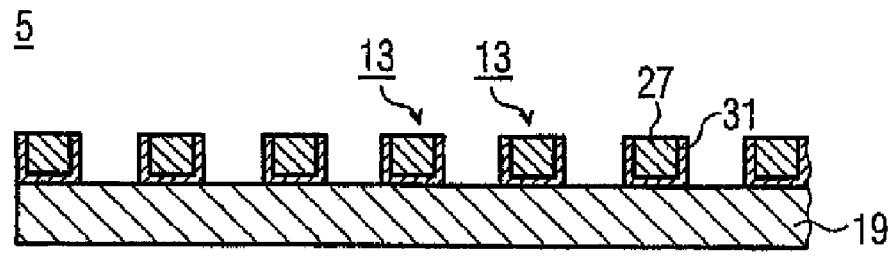
FIG. 4 shows a further cross section through a secondary part of a linear motor.

The illustration in FIG. 4 shows teeth 13 which are in the form of grooves 31, with the grooves 31 being filled with a filling material 27. The filling material 27 advantageously has a soft-magnetic material.

Figure 5:
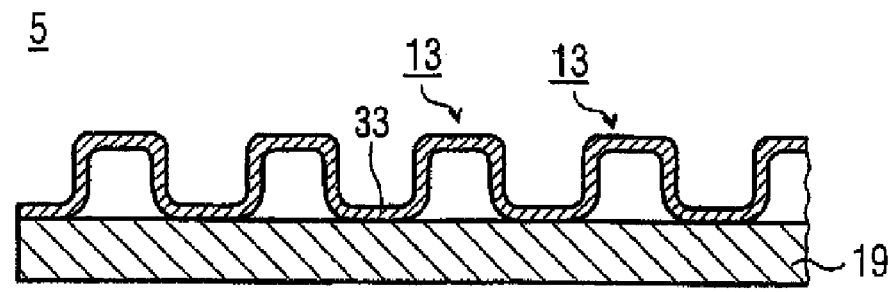
FIG. 5 shows a toothed profile, stamped in a rectangular shape, of a secondary part.

The illustration in FIG. 5 shows a secondary part 5, which has a laminate 33 resting on the tooth mount 19. The laminate 33 is shown in the form of a cross-sectional profile in FIG. 5. The cross section is shown in such a manner that it has rectangular teeth 13 in the cross section.

Figure 6:
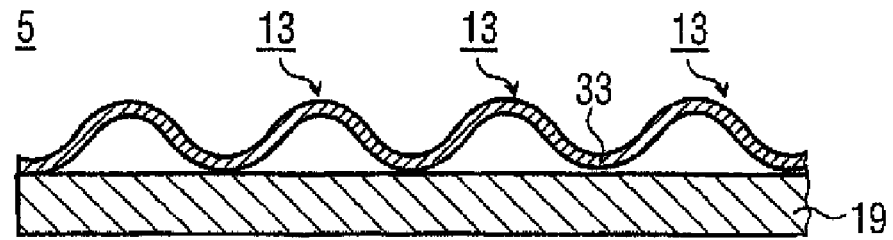
FIG. 6 shows a toothed profile, stamped in a corrugated shape, of a secondary part.

The illustration in FIG. 6 shows a secondary part 5 which has a laminate 33 resting on the tooth mount 19. The laminate 33 is shown in the form of a cross-sectional profile in FIG. 6. The cross section is shown in such a manner that it has corrugated teeth 13 in the cross section.

Figure 7:
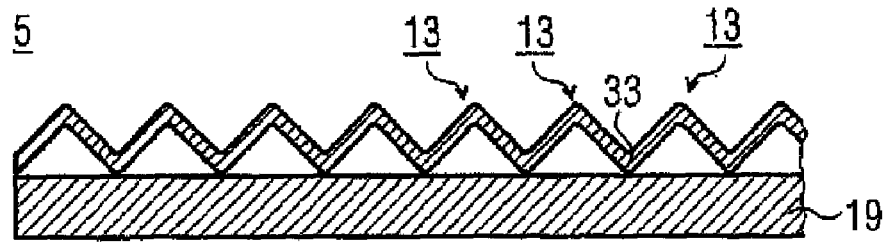
FIG. 7 shows a toothed profile, stamped in a corrugated shape, of a secondary part.

The illustration in FIG. 7 shows a secondary part 5, which has a laminate 33 resting on the tooth mount 19. The laminate 33 is shown in the form of a cross-sectional profile in FIG. 7. The cross section is shown in such a manner that it has triangular teeth 13 in the cross section.

Motor characteristics can be specifically influenced and/or optimized by means of different tooth geometries which, for example, are illustrated in FIGS. 5 to 7. The aim of the optimization and influencing processes are, for example:
  to reduce disturbing cogging forces,
  to reduce harmonics in the induced voltage,
  to improve the "sinusoidal nature" of the induced voltage,
  etc.

The various cross sections can be implemented particularly easily, as illustrated, by means of a stamped laminate having a different wave shape.

The teeth shown in FIGS. 4 to 7 have a longitudinal extent transversely with respect to the movement direction of the electrical machine, which has a secondary part such as this with a corresponding toothed profile. This longitudinal extent of the teeth is not shown in FIGS. 4 to 7, but can be seen in FIG. 8.

Figure 8:
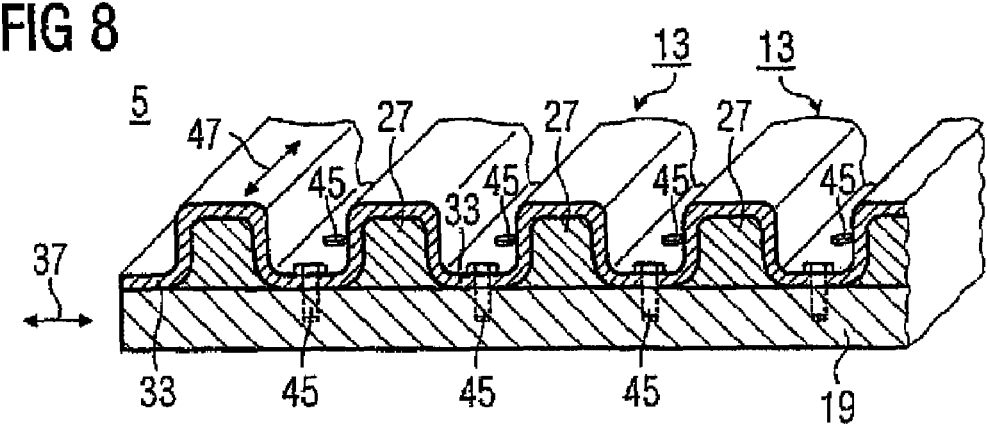
FIG. 8 shows a toothed profile screwed to a tooth mount.
Figure 9:
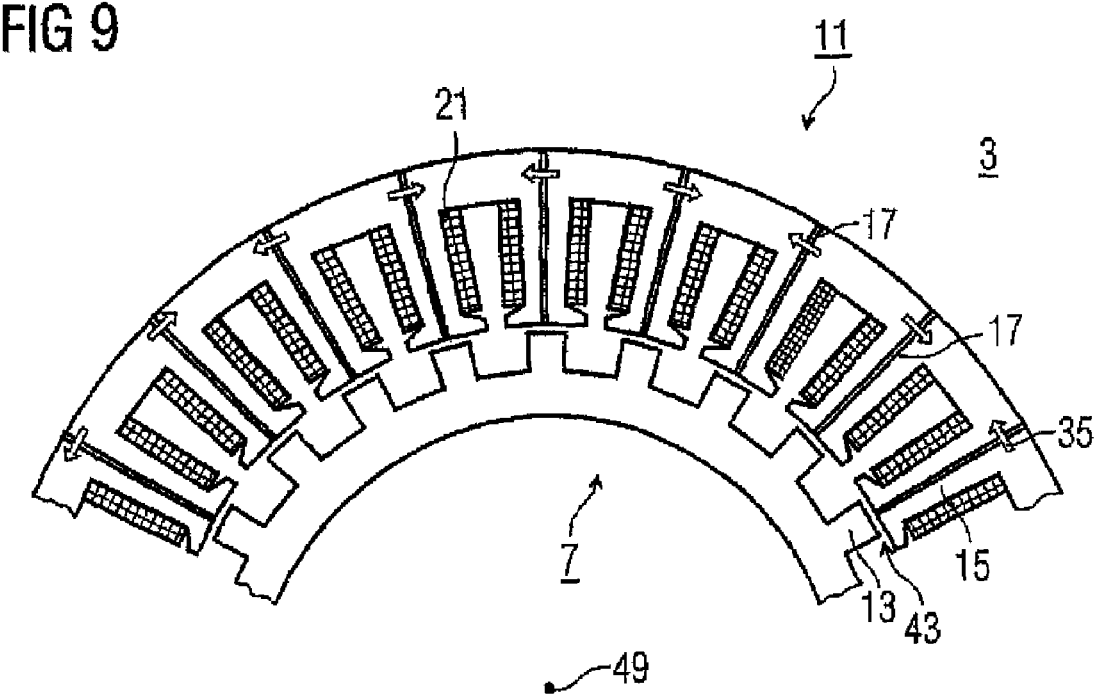
FIG. 9 shows a toothed profile for a rotating electrical machine.

The illustration in FIG. 8 shows a perspective view of a secondary part 5, which has a laminate 33 with a rectangular cross section, with the laminate being attached to the tooth mount 19 by means of screws 45. This illustration in FIG. 8 also shows the longitudinal extent 47 of the teeth 13, with the longitudinal extent of the teeth 13 being aligned transversely with respect to a longitudinal direction 37 of the secondary part 5.

The teeth 13 can be provided with a side termination. This side termination is used, for example, to form a cavity which can be filled with the filling material 27, without the filling material 27 running out of it again. It thus has a shape for filling the filling material. The side termination, which is located on the longitudinal end faces of the secondary part 5, is not shown in FIG. 8, for clarity reasons.

The movement direction which is supported by the electrical machine may be of a linear or else of a rotary nature. The illustrations in FIGS. 1 to 8 relate to linear movement directions in the longitudinal direction 37. The illustration in FIG. 9 shows a detail of a cross section of a rotating electrical machine 3. This electrical machine 3 has a primary part 11 and a secondary part 7. The two parts have a circular cross section. The primary part 11, like the primary part of a linear motor, has windings 21, winding teeth 15 and permanent magnets 17. Arrows 35 indicate the alternating magnetization direction of the permanent magnets 17. The secondary pad 7 has teeth 13, with the teeth 13 being separated from the primary part 11 by the air gap 43. By way of example, the secondary part 7 in FIG. 9 is integral. The teeth 13 have a longitudinal alignment, which is not illustrated, along a rotation axis 49, so that the teeth 13 form a type of bolt. A cross section through plurality of bolts approximately at right angles to their longitudinal extent, describes the toothed profile.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A secondary part of an electrical machine, comprising:
   a toothed profile, with at least one tooth being unlaminated, wherein the at least one tooth is formed by an outer jacket which is made of a first material selected from the group consisting of stainless steel and aluminum and defines a cavity; and
   an iron-containing second material which is different than the first material, said cavity being filled with the second material to conduct a magnetic flux without producing a magnetic field and thereby limit magnetic loss.

2. The secondary part of claim 1, wherein the iron-containing material is an iron-plastic mixture.

3. The secondary part of claim 1, further comprising a tooth mount in single-piece construction with the at least one tooth.

4. The secondary part of claim 1, further comprising a tooth mount, and a connection means for securing the at least one tooth to the tooth mount.

5. The secondary part of claim 4, wherein the connection means includes weld beads to secure the at least one tooth to the tooth mount.

6. The secondary part of claim 1, wherein the tooth profile is formed from a laminate.

7. The secondary part of claim 1, wherein the outer jacket has the shape of a tube.

8. The secondary part of claim 1, wherein the at least one tooth is made by a process selected from the group consisting of die-casting, injection-molding, and powder pressing.

9. An electrical machine, comprising a secondary part having a toothed profile, with at least one tooth being unlaminated, wherein the at least one tooth is formed by an outer jacket which is made of a first material selected from the group consisting of stainless steel and aluminum and defines a cavity, and an iron-containing second material which is different than the first material, said cavity being filled with the second material to conduct a magnetic flux without producing a magnetic field and thereby limit magnetic loss.

10. The electric machine of claim 9, wherein the iron-containing material is an iron-plastic mixture.

11. The electric machine of claim 9, further comprising a tooth mount in single-piece construction with the at least one tooth.

12. The electric machine of claim 9, further comprising a tooth mount, and a connection means for securing the at least one tooth to the tooth mount.

13. The electric machine of claim 12, wherein the connection means includes weld beads to secure the at least one tooth to the tooth mount.

14. The electric machine of claim 9, wherein the tooth profile is formed from a laminate.

15. The electric machine of claim 9, wherein the outer jacket has the shape of a tube.

16. The electric machine of claim 9, wherein the at least one tooth is made by a process selected from the group consisting of die-casting, injection-molding, and powder pressing, wherein the at least one tooth forms a cavity.

* * * * *